J. BANASH.
ANIMAL TRAP.
APPLICATION FILED AUG. 24, 1918.

1,290,697.

Patented Jan. 7, 1919.

INVENTOR.
Joe Banash,
BY
his ATTORNEY.

UNITED STATES PATENT OFFICE.

JOE BANASH, OF INDIANAPOLIS, INDIANA.

ANIMAL-TRAP.

1,290,697.   Specification of Letters Patent.   Patented Jan. 7, 1919.

Application filed August 24, 1918. Serial No. 251,217.

*To all whom it may concern:*

Be it known that I, JOE BANASH, a subject of the King of Hungary, residing at Indianapolis, county of Marion and State of Indiana, have invented certain new and useful Improvements in Animal-Traps, of which the following is a specification.

This invention relates to improvements in traps and particularly to types adapted to destroy small animals such as mice and the like.

The principal object of the invention is to provide a trap made entirely of metal so that animal odor may be removed therefrom by heating, fumigating, or the like.

A further object is to provide a trap which is comprised of a few and simple parts, readily put into position for operation without danger to the operator, and Finally to provide a trap which will give an audible sound when the same is sprung by an animal.

These and other like objects are attained by the novel construction and combination of parts, hereinafter described and shown in the accompanying drawings, forming a material part of the disclosure, and in which—

Figure 1:
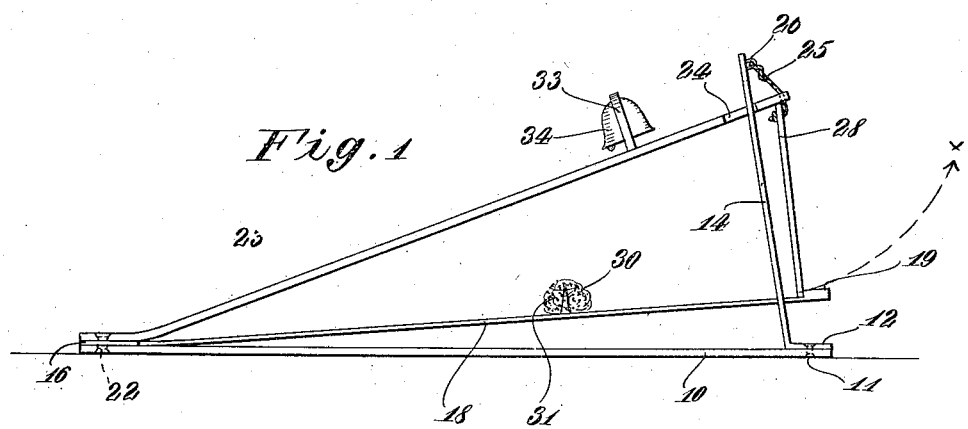
Figure 1 is a side elevational view, showing a trap made in accordance with the invention.
Figure 2:
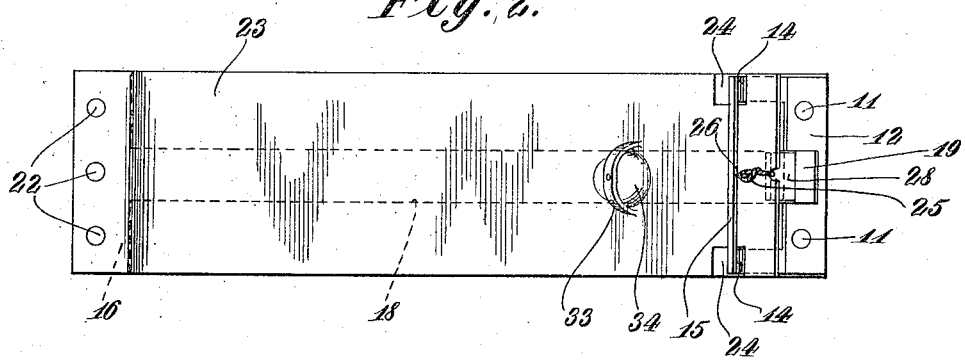
Fig. 2 is a top plan view of the same.
Figure 3:
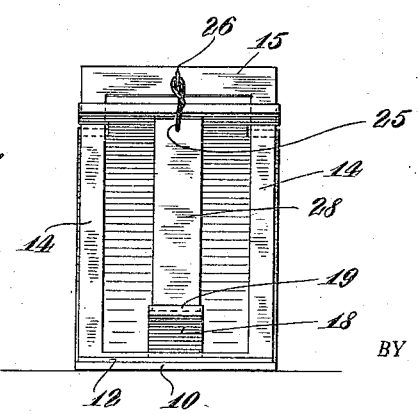
Fig. 3 is a front elevational view thereof.

Referring to the drawings, which show a trap comprised of a base plate 10, to which is secured by rivets or like fastenings 11, a footing 12, from which rises a diagonally disposed, open rectangular frame having side walls 14, connected by a cross bar 15 at the top. At the opposite end of the platform or plate 10 is secured the T shaped end 16 of a relatively thin, narrow resilient plate 18, having a fixed transverse projection 19 at its extreme front end, which extends practically coincident with the front of the plate 10, between the elements 14 of the diagonal frame.

Also secured above the T shaped element 16, by rivets 22, is a heavier, wider resilient plate 23 notched upon its opposite sides 24 near its front end, the notches being so positioned as to engage with the inner sides of the frame elements 14, between which it operates.

A flexible connecting element, as a cord 25, is secured in an eye 26 in the cross bar 15, the same extending over the front edge of the spring plate 23 and connected with an opening formed in the upper end of a bar or strut 28, the strut resting in its lower end upon the narrow leaf plate 18 closely adjacent to the enlargement 19. A lure 30 is engaged upon a pin or spur 31, secured near the outer end of the leaf plate 18, the same serving to attract animals thereto, and secured upon the upper surface of the spring leaf plate 23, by a support 33, is an ordinary bell 34, adapted to ring automatically when the plate 23 is released.

In operation, when it is desired to set the trap, the upper heavier plate 23, is extended and the strut 28 adjusted so as to contact with the lower surface of the plate 23, its outer end being held in position by the flexible cord 25, while the lower end of the strut is placed upon the upper surface of the leaf plate 18, adjacent to the lug 19, so it will be held in position.

Upon contact by an animal with the lure 30, the plate 18, is depressed releasing the strut 28 so as to cause it to spring out as indicated by the dotted line and arrow X, while the heavier spring plate 23 strikes forcibly downward upon the base 10, making contact with what ever animal or article may be disposed therebetween.

From the foregoing it will be seen that a simple and effective device has been disclosed, comprised of few parts which are easily operated, and which is effective in its purpose.

Having thus described my invention what I claim as new and desire to secure by Letters Patent, is—

1. A mouse trap comprising a base plate, a spring lure plate rigidly engaged at one end of said base plate, a striking plate secured over said lure plate, a U shaped guide secured to said base plate in which said striking plate operates, a strut interposed between said lure plate and said striking plate, a flexible connection between the upper member of the said U shaped guide and the upper end of said strut, means on said lure plate for holding said strut normally in an operative position, said means consequent upon contact of the animal with said lure plate permitting dislodgment of said strut.

2. A mouse trap comprising a base plate, a spring lure plate secured at one end thereof, a spring striking plate secured over said lure plate, a U shaped guide secured at the opposite end of said base plate, in which said striking plate operates, a strut adapted to make contact with the inner surface of said striking plate, a flexible connection between said U shaped guide and said strut whereby it is held in operative position, a lug formed with said lure plate against which said strut normally makes contact, a lure carried by said lure plate, and a bell carried by said striking plate.

In testimony whereof I have affixed my signature.

JOE BANASH.

Copies of this patent may be obtained for five cents each, by addressing the "Commissioner of Patents, Washington, D. C."